United States Patent
Czinki et al.

(10) Patent No.: US 7,237,834 B2
(45) Date of Patent: Jul. 3, 2007

(54) PANELING ELEMENT FOR THE ROOF OF A VEHICLE INTERIOR

(75) Inventors: Alexander Czinki, Bonn (DE); Jürgen Kretschmer, Esslingen (DE); Torsten Leenaerts, Wuppertal (DE); Wolfgang Mueller, Wermelskirchen (DE)

(73) Assignee: Johnson Controls GmbH, Burscheid (DE)

( * ) Notice: Subject to any disclaimer, the term of this patent is extended or adjusted under 35 U.S.C. 154(b) by 124 days.

(21) Appl. No.: 10/490,271

(22) PCT Filed: Sep. 19, 2002

(86) PCT No.: PCT/EP02/10505

§ 371 (c)(1),
(2), (4) Date: Mar. 22, 2004

(87) PCT Pub. No.: WO03/026929

PCT Pub. Date: Apr. 3, 2003

(65) Prior Publication Data

US 2004/0239151 A1   Dec. 2, 2004

(30) Foreign Application Priority Data

Sep. 21, 2001 (DE) .............................. 101 46 694

(51) Int. Cl.
*B60J 7/00* (2006.01)

(52) U.S. Cl. .................. 296/214; 296/208; 296/216.04

(58) Field of Classification Search ................ 296/214, 296/39.1, 208, 216.01, 216.04; 454/108, 454/137
See application file for complete search history.

(56) References Cited

U.S. PATENT DOCUMENTS

| 5,415,554 | A | | 5/1995 | Kempkers et al. |
| 6,062,635 | A | * | 5/2000 | Learman et al. ............ 296/208 |
| 6,120,091 | A | * | 9/2000 | Reich et al. ................. 296/214 |
| 6,523,887 | B1 | | 2/2003 | Picken et al. |
| 6,543,841 | B1 | | 4/2003 | Ohkubo |

(Continued)

FOREIGN PATENT DOCUMENTS

DE   29 26 712 A1   1/1980

(Continued)

*Primary Examiner*—Joseph D Pape
(74) *Attorney, Agent, or Firm*—Foley & Lardner LLP

(57) ABSTRACT

A panel system for use within an interior of a vehicle includes a panel member configured for placement along the overhead portion of the interior of the vehicle. A support member substantially surrounds the panel member and is configured for attachment to the vehicle. The support member includes frame segments interconnected by connectors. At least one fastener is provided for securing the panel member to the support member. An accessory mounted is to a receiving structure on a frame segment and is configured for use by an occupant of the vehicle.

47 Claims, 12 Drawing Sheets

U.S. PATENT DOCUMENTS

| | | |
|---|---|---|
| 6,575,528 B2 | 6/2003 | Tiesler et al. |
| 6,629,718 B2 | 10/2003 | Bauer et al. |
| 6,652,021 B1 | 11/2003 | Dykman et al. |
| 6,685,262 B1 | 2/2004 | Tiesler et al. |
| 6,733,034 B2 | 5/2004 | Tiesler |
| 6,749,244 B1 | 6/2004 | Song |
| 6,749,255 B2 | 6/2004 | Dykman et al. |
| 6,805,828 B2 | 10/2004 | Raasakka et al. |
| 6,824,164 B2 | 11/2004 | Pywell |
| 6,860,014 B2 | 3/2005 | Wieschermann et al. |
| 2003/0020299 A1 | 1/2003 | Bauer et al. |
| 2003/0098595 A1 | 5/2003 | Carter et al. |
| 2003/0155794 A1 | 8/2003 | Itoh et al. |
| 2004/0150252 A1 | 8/2004 | Schlachter et al. |
| 2004/0155490 A1 | 8/2004 | Homann et al. |
| 2004/0160072 A1 | 8/2004 | Carter et al. |
| 2004/0169390 A1 | 9/2004 | Tiesler et al. |
| 2004/0198123 A1 | 10/2004 | Gillingham et al. |

FOREIGN PATENT DOCUMENTS

| | | |
|---|---|---|
| DE | 30 47 418 A1 | 7/1982 |
| DE | 38 20 845 A1 | 12/1989 |
| DE | 297 16 574 U1 | 3/1998 |
| EP | 0 203 484 A2 | 12/1986 |
| EP | 0 724 981 A1 | 8/1996 |
| EP | 0 900 699 A2 | 3/1999 |
| WO | WO 03/078186 A1 | 9/2003 |

\* cited by examiner

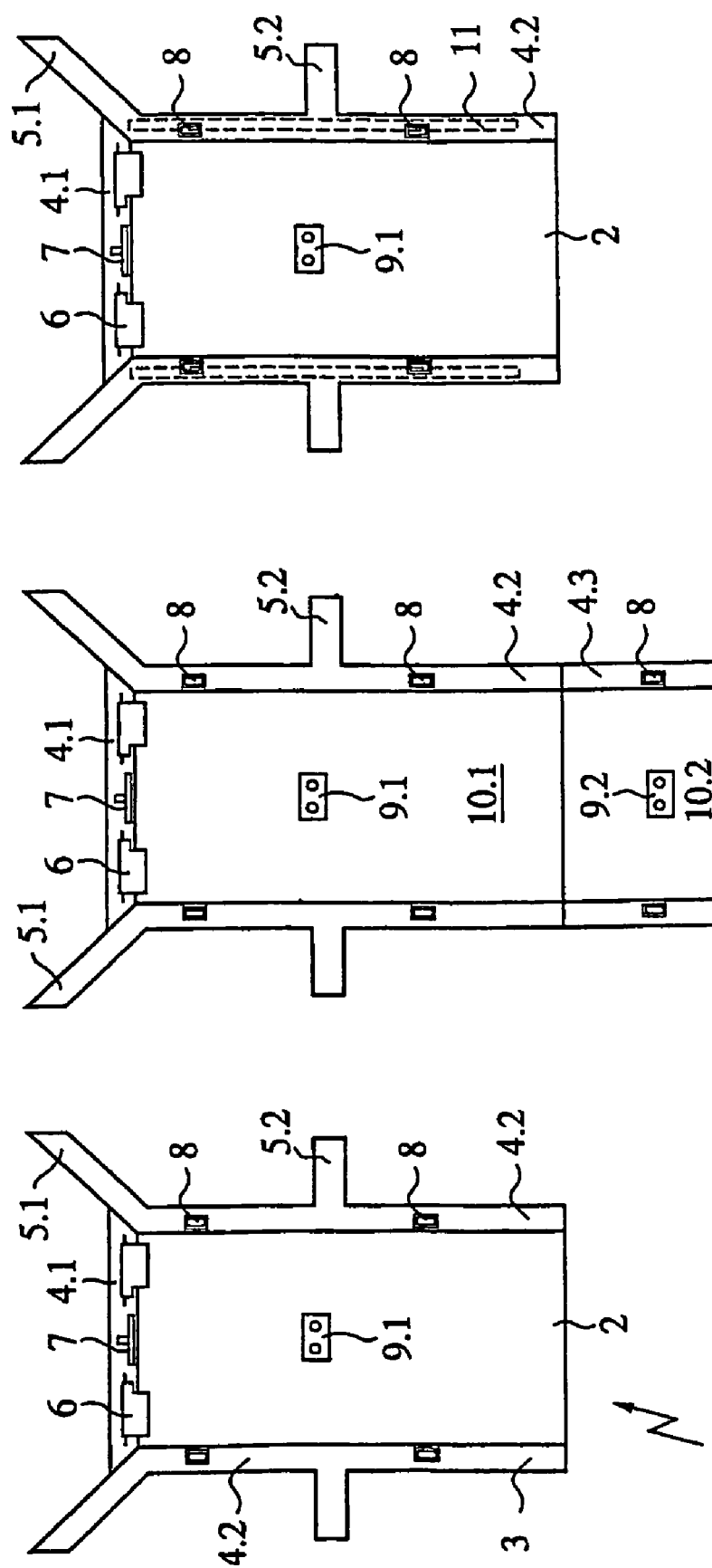

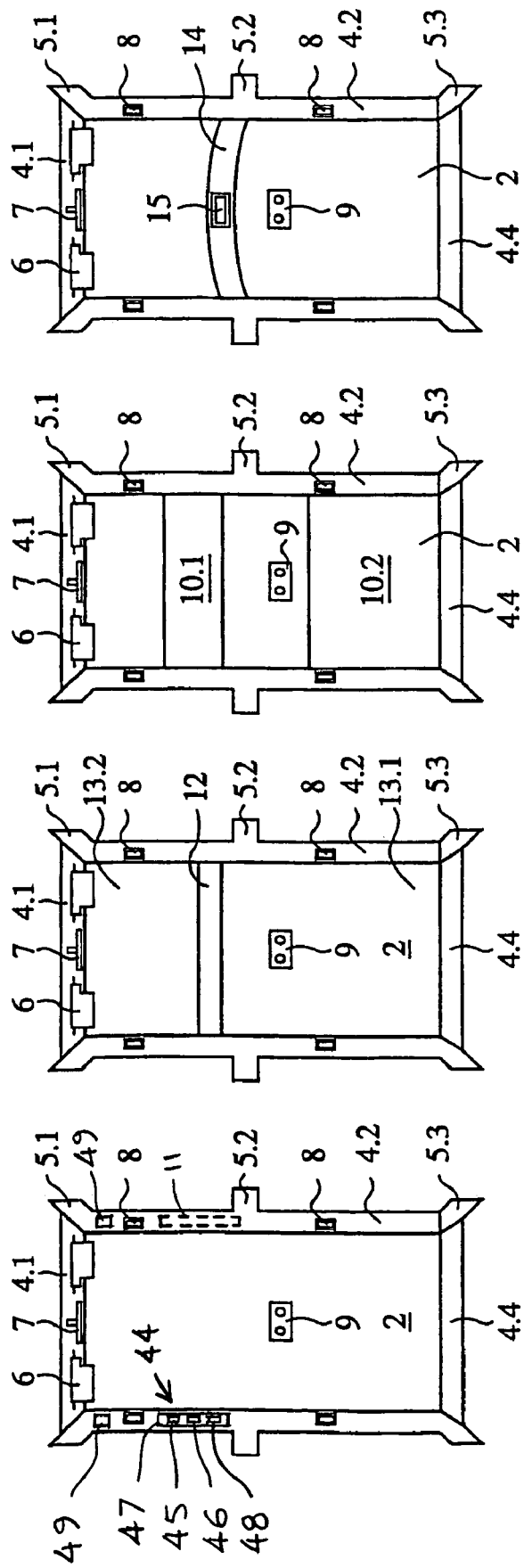

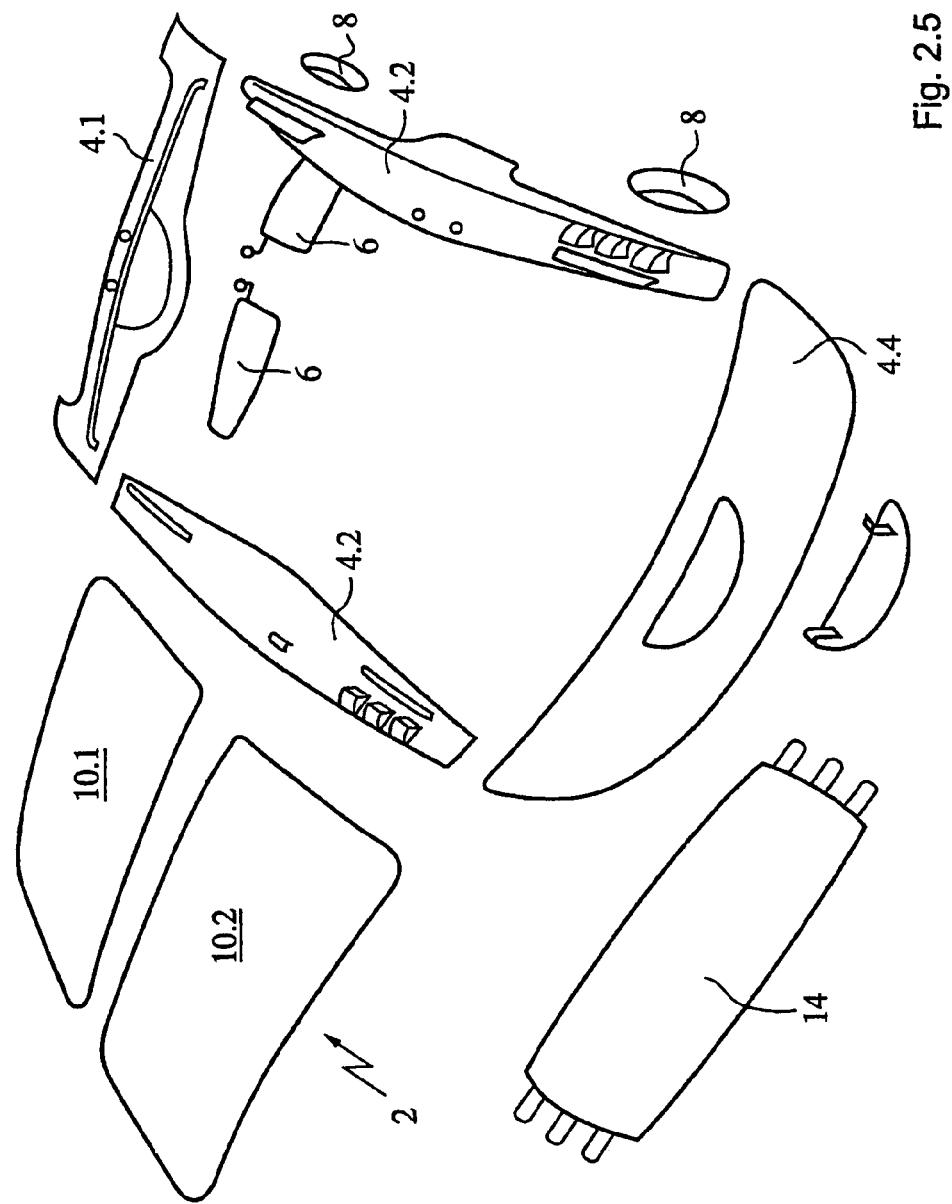
Fig. 2.5

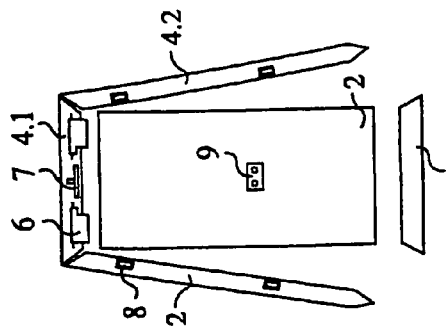
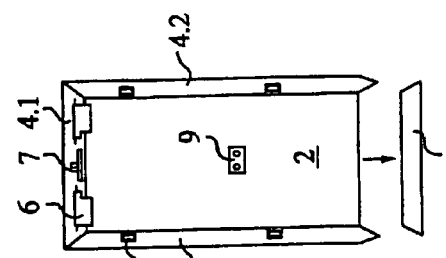
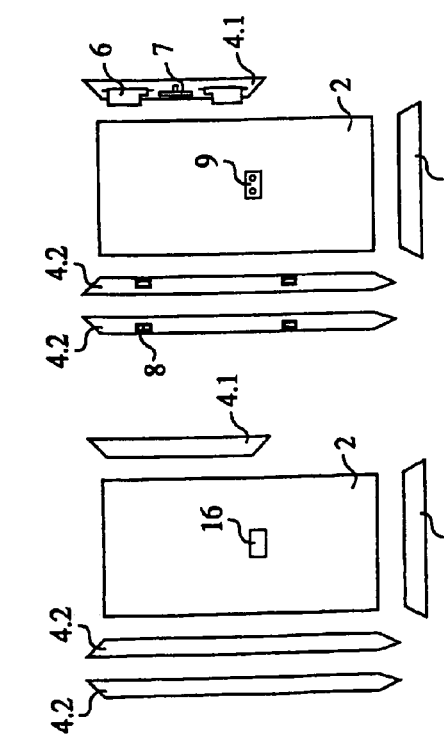
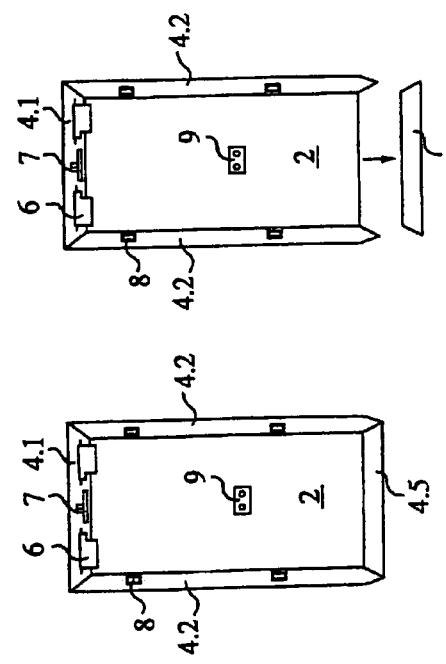

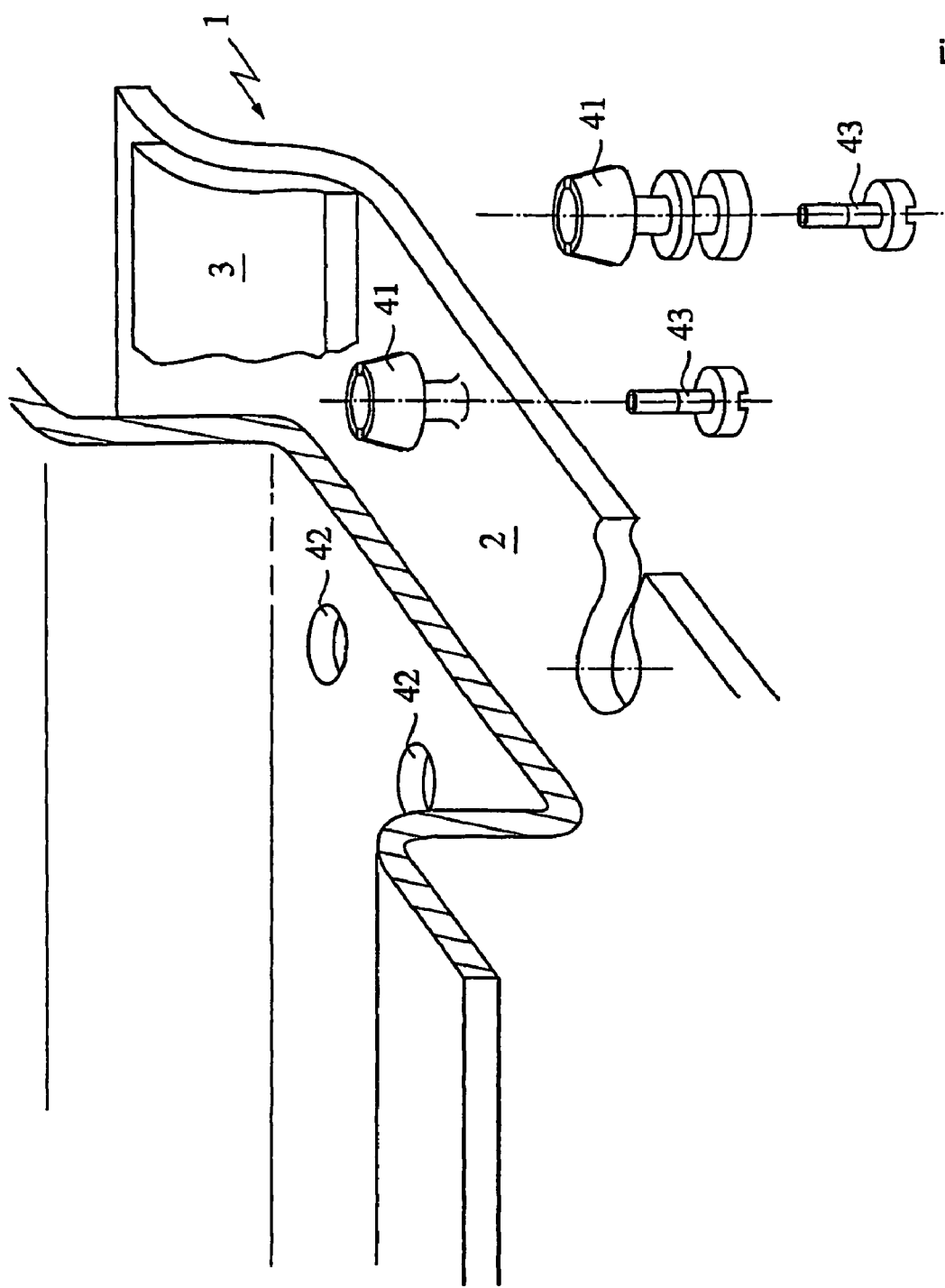

PANELING ELEMENT FOR THE ROOF OF A VEHICLE INTERIOR

CROSS REFERENCE TO RELATED APPLICATIONS

The present Application claims the benefit of priority to the following international Applications: PCT Patent Application No. PCT/EP02/10505 titled "Paneling Element For The Roof Of A Vehicle Interior" filed on Sep. 19, 2002 which published under PCT Article 21(2) on Apr. 3, 2003 as WO 03/026929 A1 in the German language and German Patent Application No. 10146694.3-21 filed on Sep. 21, 2001 (which are incorporated by reference in their entirety).

FIELD

The invention relates to a paneling element for the roof of a vehicle interior, comprising a filling panel and support elements connected to the latter, and also to a method for producing a paneling element of this type.

BACKGROUND

The patent specification EP 0 203 484 B1 discloses a paneling element of the generic type for the roof of a vehicle interior. The paneling element comprises a preshaped, rigid plastic panel which is configured in such a manner that it covers the upper and lateral inner surfaces of the roof of the vehicle body. The front end side of the plastic panel is connected to a transversely extending support element used to hold the sun visors and the inner rear view mirror. Two struts are furthermore arranged on the upper side of the plastic panel in the longitudinal direction, said struts not being directly connected to the support element and being used as ventilation ducts. Furthermore, a single-piece frame which is suitable for holding a sliding roof can be placed onto the upper side of the plastic panel.

This paneling element does indeed facilitate the installation of the interior lining, since accessory parts are fitted in an ergonomically favorable position together with the support element beforehand to form a module which, after the assembly to form a complete paneling element, is anchored in the body. However, the flexibility of the selected construction in respect of different structural shapes of the body or equipment variants is limited, since the preshaped, non-adaptable plastic panel constitutes the determining part of the paneling element. The production of the large stiff plastic panel furthermore requires the use of complex and cost-intensive tools.

The documents DE 198 47 495 A1 and 198 47 496 A1 relate to roof modules for the A- and B-pillar of vehicle interiors, said roof modules, in the form of preassembled subassemblies, accommodating equipment parts, for example grab handles, lights or sun visors, and being fitted in the interior of the vehicle after the roof lining has been inserted. The same roof module can be used in different structural shapes of the body, for example, in a sedan or station wagon; furthermore, the fastening elements of the roof module can be used at the same time for fixing the roof lining.

In contrast, the roof lining as such cannot be adapted; furthermore, this relatively large component which is not stabilized is unfavorable in terms of handling due to its spatial extent.

It is furthermore known from practice to produce a paneling element with a frame by the inner region being punched out of a panel-like, preshaped component of stiff material and a lightweight and deformable filling being inserted into the remaining, frame-like segment.

Even with this procedure, adaptation to different structural shapes of the body is not possible; in addition, considerable quantities of waste are produced which have to be supplied for reprocessing or disposed of.

SUMMARY

The invention is based on the object of providing a paneling element which can be produced with cost-effective tools and can be adapted to the relevant structural shape of the body. Furthermore, the recycling of the component and the subsequent equipping of the vehicle with accessory parts are to be simplified.

According to one embodiment of the present invention the object is achieved by the support elements of the generic paneling element forming a frame which surrounds the filling panel at least in a U shape and is composed of at least two interconnected frame segments.

According to the embodiment, the rigid frame segments which are small in comparison with the dimensions of the paneling element can be produced by cost-effective tools. The paneling element which is ready for fitting obtains its stiffness essentially by means of the frame which is joined together from the frame segments and which surrounds the filling panel, which is of relatively simple construction, in a supporting manner. In this case, the filling panel may be of flat or curved design and may entirely or partially cover the frame for esthetic reasons after it has been fitted into the vehicle. The roof region is not restricted necessarily to the horizontal sheet-metal structure of the vehicle body but rather may also include the pillars of the vehicle roof (belt-line up).

If vehicles are manufactured with the same structural shape of the body, but with different equipment variants, essential parts of the paneling element may be retained while only the components affected by the changes are changed. If a vehicle were, for example, to be ordered optionally with a side airbag arranged in the roof lining, only the relevant, lateral frame segments of the paneling element would be correspondingly adapted while the filling panel or a frame segment running between the A-pillars would correspond to the basic version.

Alternatively, when a vehicle designed as a station wagon is manufactured, use could be made of the U-shaped roof lining frame of the sedan by inserting further frame segments as a limb extension and fitting a relatively large filling panel.

According to another embodiment of the present invention, the use of certain subassemblies in vehicles with different platforms is conceivable (carry-over principle).

The frame can advantageously support the paneling element if it surrounds the filling panel around the entire circumference.

In order to simplify the installation of the paneling element, according to another embodiment of the present invention, it is proposed that the frame segments are provided in their connecting regions with coupling devices for the transmission of electric current, light or light signals, mechanical movements or liquid or gaseous fluids. This can make it unnecessary to lay cables or pipes in the paneling element after joining of the frame. This is particularly advantageous if the frame segments have operating elements which are to be actuated from the vehicle interior (A side) or functional elements on the roof structure side (B side) which faces the vehicle body, which elements may be supplied with power in an appropriate manner.

The operating elements 44 can advantageously be designed as a keypad 45 and are designed, for example, as switches 46 which are separated from the vehicle interior by a flexible film 47. Warning lights 48 or the like may also be arranged behind regions of the film 47 which are kept transparent (see FIG. 2.1). A component of this type can be produced, for example, by spraying a stiff plastic behind an appropriate film.

According to a further embodiment of the present invention, the frame segments also bear accessory parts which can be anchored in an ergonomically favorable working position in the frame segments, if appropriate before the frame segments are joined to form a frame. These include, for example, sun visors, rear view mirrors, airbags, illuminating devices, etc. The relevant receiving points may already be formed in the frame segment, which simplifies the positioning and fastening of the accessory parts. Furthermore, devices for guiding and fixing power cables, electrical conductors or flexible tubes may also be placed into the frame segments in order to make it easier to install them.

To simplify recycling, the frame segments are preferably manufactured from the same material. In order, during the subsequent operation of the vehicle, to avoid formation of noise in the region in which the frame segments are connected, it may be advantageous to place a separating layer of a different material into the abutting points, the separating layer preventing the frame segments from rubbing on one another. If the frame segments consist, for example, of glass-fiber-reinforced polypropylene, a separating layer of a thermoplastic elastomer can be placed into the connecting region. The separating layer can be applied directly to the frame segments in the form of a coating or can be placed into the abutting region as a separate shaped part during the joining of the frame. The shaped part may also be provided with latching devices by means of which the frame segments are connected to one another. Coupling devices for the transmission of energy in the shaped part may also be provided, the coupling devices communicating with corresponding counterparts in the frame segments.

The frame segments can be connected to one another, for example with a cohesive material joint, in particular by welding or bonding, as a result of which a formation of noise in the connecting region is minimized, but a separation for later recycling may be more difficult. A form-fitting connection, for example by latching or screwing, tend to make recycling easier and also enables a frame segment to be removed temporarily for repair or retrofitting work.

In the case of a form-fitting connection, it is furthermore conceivable for certain frame segments, which serve to stiffen the paneling element so as to improve the handling until it is fitted into the interior, to be removed again after the paneling element has been anchored in the vehicle body. Installation aids of this type could simultaneously have securing devices which make it possible for it to be connected to a device for introducing or positioning the paneling element in the vehicle interior and can be connected, for example, to the arm of an industrial robot or the like.

The filling panel may be designed in a single piece, but may also be composed of a plurality of segments. For example, a filling panel which can be used in a sedan could also be used in a station wagon by fitting a panel-like extension.

Accordingly, the segments of the filling panel can be connected to one another with a cohesive material joint or in a form-fitting manner and, in the abutting region, which typically runs transverse with respect to the direction of travel, can have coupling devices for the transmission of energy, if accessory parts to be supplied with energy are arranged in the segments of the filling panel.

It may be advantageous to surround the segments of the filling panel with the frame around the entire circumference, where the frame may have corresponding transverse or longitudinal struts. If required, individual areas of the frame may be formed without a filling in order, for example, to allow access to a sliding roof or the like.

According to another embodiment of the present invention, provision is made to arrange the segments of the filling panel in a displaceable manner relative to one another. This makes it possible, for example, for a glass roof situated in the vehicle roof to either be uncovered or covered.

In principle, the filling panel may also be fastened in the frame with a cohesive material joint or in a form-fitting manner. In this case, a form-fitting connection may take place not only by latching or screwing devices, but also, for example, by the insertion of the filling panel into grooves of the frame. In this case, the transmission of energy from the frame into the filling panel is likewise advantageous if the filling panel is equipped with corresponding conductor devices.

According to a further embodiment of the present invention, provision is made for a transverse or longitudinal support element which spans the filling panel on the interior side to be able to be placed into the frame, after the paneling element has been fitted into the vehicle. Such a support element could run, for example, between the B-pillars of the vehicle and could be provided with viewing screens for the rear passengers. A vehicle could therefore also be retrofitted with this accessory, in which case the devices for fastening the transverse or longitudinal support element and coupling devices for supplying energy are already present in the frame during the manufacturing of the paneling element.

According to another embodiment of the present invention, the frame segments are furthermore provided with devices 49 (see FIG. 2.1) for absorbing kinetic energy, in particular with ribbings, honeycomb structures, inserts of foam materials, for example foamed aluminum, or the like.

The production of a paneling element for the roof of a vehicle interior from support elements and a filling panel can take place by the separate manufacturing of the filling panel and the frame segments which are used as the support elements and into which some or all of the operating and functional elements and coupling devices are subsequently fitted. The frame segments and the filling panel may then be joined to form a paneling element with a frame which surrounds the filling panel at least in a U shape and which is subsequently fitted into the vehicle body. As a result of this operation, the frame segments and filling panel may be produced from entirely different materials and using different manufacturing methods. It is thus conceivable to use relatively small tools to manufacture the frame segments as components with a complex design from a stiff material by injection molding; in contrast, it is also conceivable to manufacture the large filling panel by cutting it out from a cost-effective semi-finished product.

According to another embodiment of the present invention, in the production of the paneling element the frame segments are already joined to form a frame before the filling panel is placed in. Alternatively, the frame segments can be brought into engagement with one another in one installation position and can then be pivoted into a final position which forms the frame and in which they are subsequently secured. During this pivoting movement, the filling panel can be placed into corresponding grooves of the frame segments and can be engaged around by the latter when the final position is reached. It is also conceivable not to put in the filling panel until the frame segments have been joined to form a frame.

According to a further embodiment of the present invention, at least one frame segment which only acts as an installation aid is separated again from the paneling element after the paneling element has been fitted into the vehicle body.

Accordingly, it would be desirable to provide a paneling element for the roof of a vehicle interior having any one or more of these or other advantageous features.

FIGURES

The figures illustrate schematically different embodiments of the invention by way of example.

In the figures:

FIGS. 1.1–1.3 show schematic diagrams of various embodiments of a paneling element.

FIGS. 2.1–2.5 show different embodiments of another paneling element in the form of a schematic diagram.

FIGS. 3.1–3.5 show the paneling element according to FIG. 1.1 in various stages of manufacturing and fitting.

FIG. 11 shows a device for fastening the paneling element to the vehicle body

DETAILED DESCRIPTION

Figure 4:
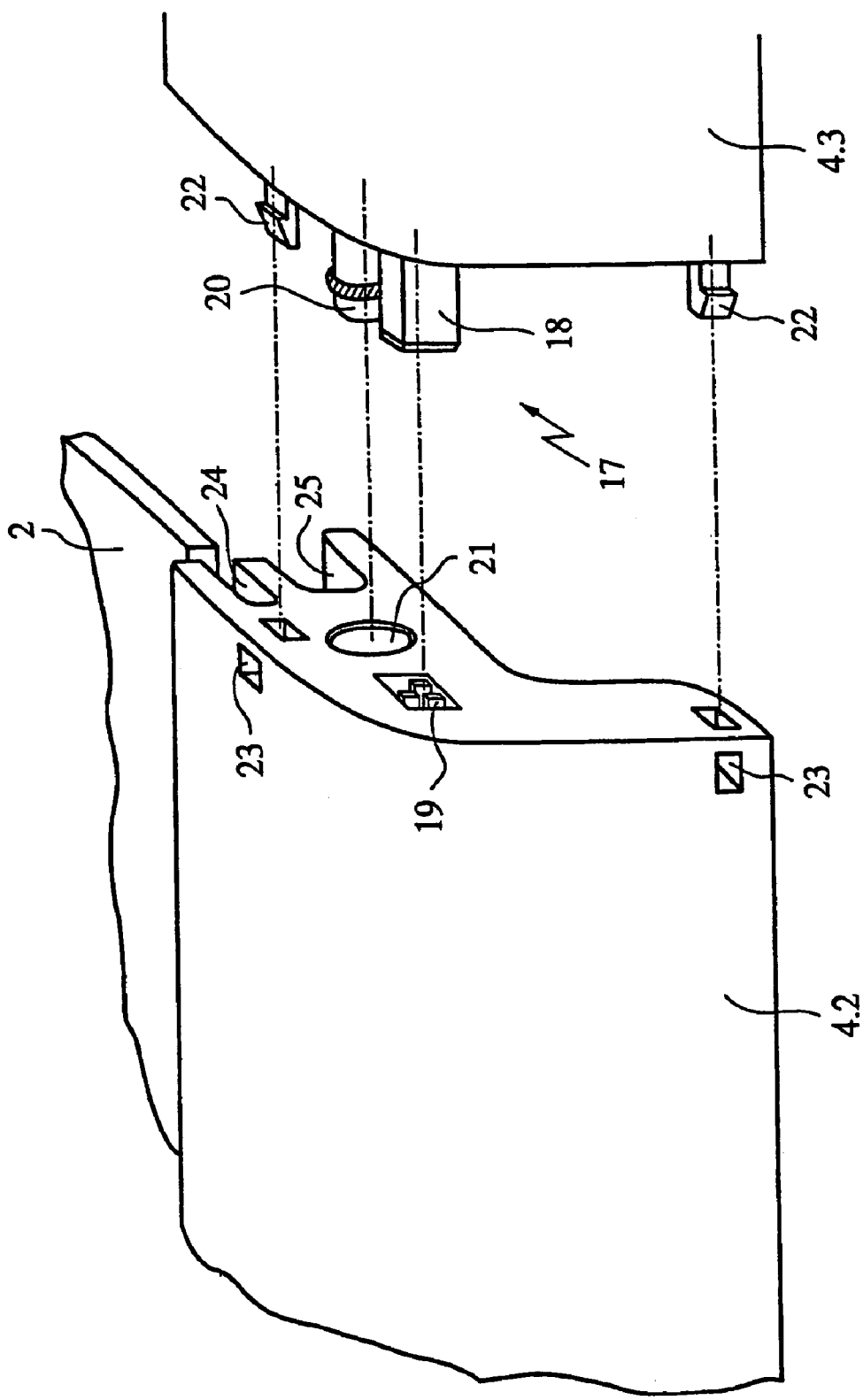
FIG. 4 shows a connecting point configured between two frame segments.

In the embodiment for a sedan (e.g. four-door type, etc.) (shown schematically in FIG. 1.1), the paneling element 1 according to FIG. 1 comprises a filling panel 2 which is surrounded by a U-shaped frame 3. The latter is composed of rigidly interconnected frame segments 4, of which one frame segment 4.1 is aligned transversely with respect to the longitudinal axis of the vehicle and is arranged between the A-pillars, while lateral frame segments 4.2 forming the "limbs" of the U-shaped frame 3 extend in the direction of travel and have downwardly directed projections 5.1 and 5.2 in each case in the region of the "A" and "B" pillars. The frame segments 4 form a generally stiff, supporting structure of the paneling element 1 while the relatively soft filling panel 2 is intended to determine, for example, the acoustic properties of the paneling element.

The frame segment 4.1 which runs transversely is shown provided with accessory parts in the form of sun visors 6 and an inner rear view mirror 7 while the lateral frame segments 4.2 are shown equipped with grab handles 8. The filling panel 2 has an illuminating console 9.1.

If a paneling element 1 is requested for a vehicle of the same product line but with an enlarged interior (FIG. 1.2), all of the components of the basic version can again be used. The enlarged dimensions of the vehicle interior are taken into account by the fact that the lateral frame segments 4.2 are extended in the longitudinal direction of the vehicle by frame segments 4.3 which are shown equipped with grab handles 8 for the occupants of a third row of seats. As shown in FIG. 1.2, the filling panel 2 is composed of a first segment 10.1, such as used in the basic version, and of an extending, second segment 10.2 which is further shown to include an illuminating console 9.2.

If a sedan is manufactured with a side airbag 11 (see FIGS. 1.3 and 2.1), the lateral frame segments 4.2 may be replaced with frame segments which contain the airbag, while the frame segments 4.1 and the filling panel 2 may remain the same. The supplier of the paneling element 1 can therefore react within a short time to requests made by the vehicle manufacturer and can prepare an adapted paneling element. Corresponding adaptations are also possible in a variety of colors and paneling materials.

In the embodiment shown according to FIG. 2.1, in addition to the projections 5.1 and 5.2 for the "A" and "B" pillars, projections 5.3 for the paneling of the "C" pillar are also shown integrally formed on the lateral frame segments 4.2. Moreover, the frame 3 is shown to surround the filling panel 2 around the circumference by the connection of a rear frame segment 4.4 which runs transversely, intended to provide a dimensionally stable component. If a vehicle of the same structural shape of the body with a glass roof is ordered, the frame according to FIG. 2.1, which is of essentially rectangular design, can be provided with an additional transverse strut 12 (FIG. 2.2). In this case, the area 13.1 formed by the transverse strut 12, the lateral frame segments 4.2 and the rear frame segment 4.4 accommodates a reduced filling panel 2 which is surrounded around its circumference by the frame, while the front area 13.2 is not covered and permits a view or access to the glass roof panel. Alternatively, the filling panel may be constructed from two segments 10.1 and 10.2, of which the front segment 10.1 is displaceable in a gap between the rear segment 10.2 and the metal structure of the vehicle roof (as shown in FIG. 2.3). Guide rails for this purpose can be integrally formed, for example, in the lateral frame segments 4.2 and can be covered in the basic version by the filling panel 2, which is shown to fill the entire frame 3 as a single piece. According to an alternative embodiment, it is also conceivable to attach these rails as separate components to the lateral frame segments 4.2.

If a vehicle supplied in the basic version is to be provided at the factory or subsequently with improved equipment, such can be undertaken according to FIG. 2.4 by inserting a transverse support element 14 between the lateral frame struts 4.2, the transverse support element spanning the filling panel on the interior side and being equipped, for example, with a display 15.

FIG. 2.5 shows the components of a paneling element designed in accordance with an embodiment of the present invention (similar to FIG. 2.4) in a perspective illustration.

In FIG. 3, method steps for the manufacturing and the fitting of the paneling element 1 shown in FIG. 1.1 are illustrated by way of example. The process as shown in FIG. 3.1 begins with the production of the individual frame segments 4.1 and 4.2 which are preferably manufactured by injection molding of a plastic. Alternatively, other manufacturing methods can be used, for example pressing or blow molding, etc. The filling panel may be cut from a semi-finished product and is provided with recesses 16 for the later accommodation of accessory parts.

Furthermore, an additional frame segment 4.5, the use of which will be explained later, may be provided.

As shown in FIG. 3.2, the frame segments 4 and the filling panel 2 are provided with accessory parts shown as the sun visors 6, the rear view mirror 7, the grab handles 8 and the illuminating console 9. Further equipment may be integrated in the frame segments, a non-exhaustive list including, for example, reading lamps, ventilation system components, storage compartments, displays for time, temperature and the like, sockets and also remote communication devices having gate drives. If a frame segment which runs transversely is to be arranged permanently in the rear region of the frame 3, the frame segment could also accommodate a brake light. In addition to the illuminating console, the filling panel may also have, for example, recesses for sliding or glass roofs panels.

The frame segments 4.1 and 4.2 are then hooked together in the outer region of their connecting points in such a manner that they form, in one installation position, a U-shaped frame 2 with spread-out "limbs" in which the filling panel 2 is placed (as shown in FIG. 3.3). The frame segments are then pivoted into their final position (as shown in FIG. 3.4), in which case the lateral frame segments 4.2 are connected at their end lying opposite the front frame segment 4.1 to the filling panel 2 by latching, screwing or bonding, for example. In addition, in this region the frame segment 4.5 is placed onto the ends of the lateral frame segments 4.2, so that the paneling element 1 is stabilized by an encircling frame for further transportation and alignment in the vehicle interior.

After the paneling element 1 has been fitted into the vehicle body, the frame segment 4.5, which acts as an installation aid, can be detached again and re-used (as shown in FIG. 3.5).

FIG. 4 shows a connection between a first frame segment, for example a lateral frame segment 4.2, and a frame segment which runs coaxially, for example the extending frame segment 4.3 which is illustrated in FIG. 1.2. Correspondingly, however, angled connections or other connections between frame segments may also be formed.

The frame segments 4.2 and 4.3 which are to be connected are provided on the end side with coupling elements 17 shown in the form of an electric plug 18 with an associated socket 19, and a connection piece 20 with an associated plug-in opening 21, the latter being used, for example, for supplying washing water to a rear-window washing device or to supply fresh air into the vehicle interior. The frame segments 4.2 and 4.3 can be connected to each other via connectors shown as latching lugs 22 which engage in corresponding latching openings 23. The filling panel 2 can be pushed into a groove 24 which extends along the frame segments 4.2. A further groove-like recess 25, into which, for example, a lighting strip (not illustrated) can be placed, is shown to run in the frame segments 4.2 and 4.3 below the groove 24.

Figure 5:
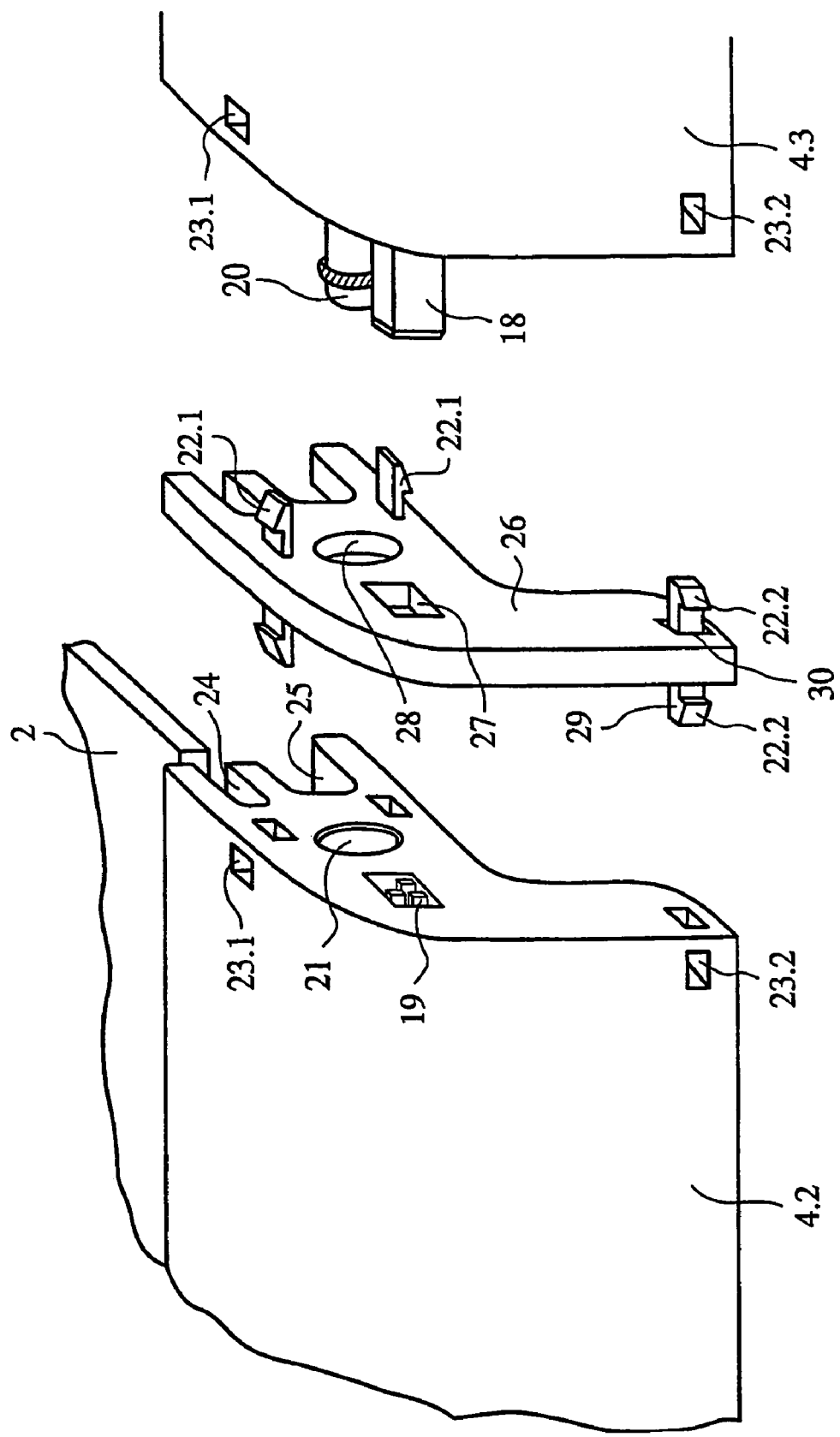
FIG. 5 shows a connecting point using a separating layer in the form of a shaped part.

In order to avoid direct contact between the end surfaces of the frame segments 4.2 and 4.3, which may result in "creaking" or "squeaking" noises during the driving operation of the vehicle, the end surfaces are spaced apart from one another in the connection (as shown in FIG. 5) by the insertion of a shaped part 26 consisting of a different material. The shaped part 26 is provided with recesses 27, 28 in the region of the coupling elements 17, so that it does not interrupt the connection. Furthermore, latching lugs 22.1 may be integrally formed on the shaped part 26 on both sides and engage in corresponding latching openings 23.1 in the frame segments 4.2 and 4.3. Alternatively, a separate shaped piece 29 can be constructed having two latching lugs 22.2, which can be inserted into the latching openings 23.2, and penetrating the shaped part 26 in the region of a further recess 30.

Figure 6:
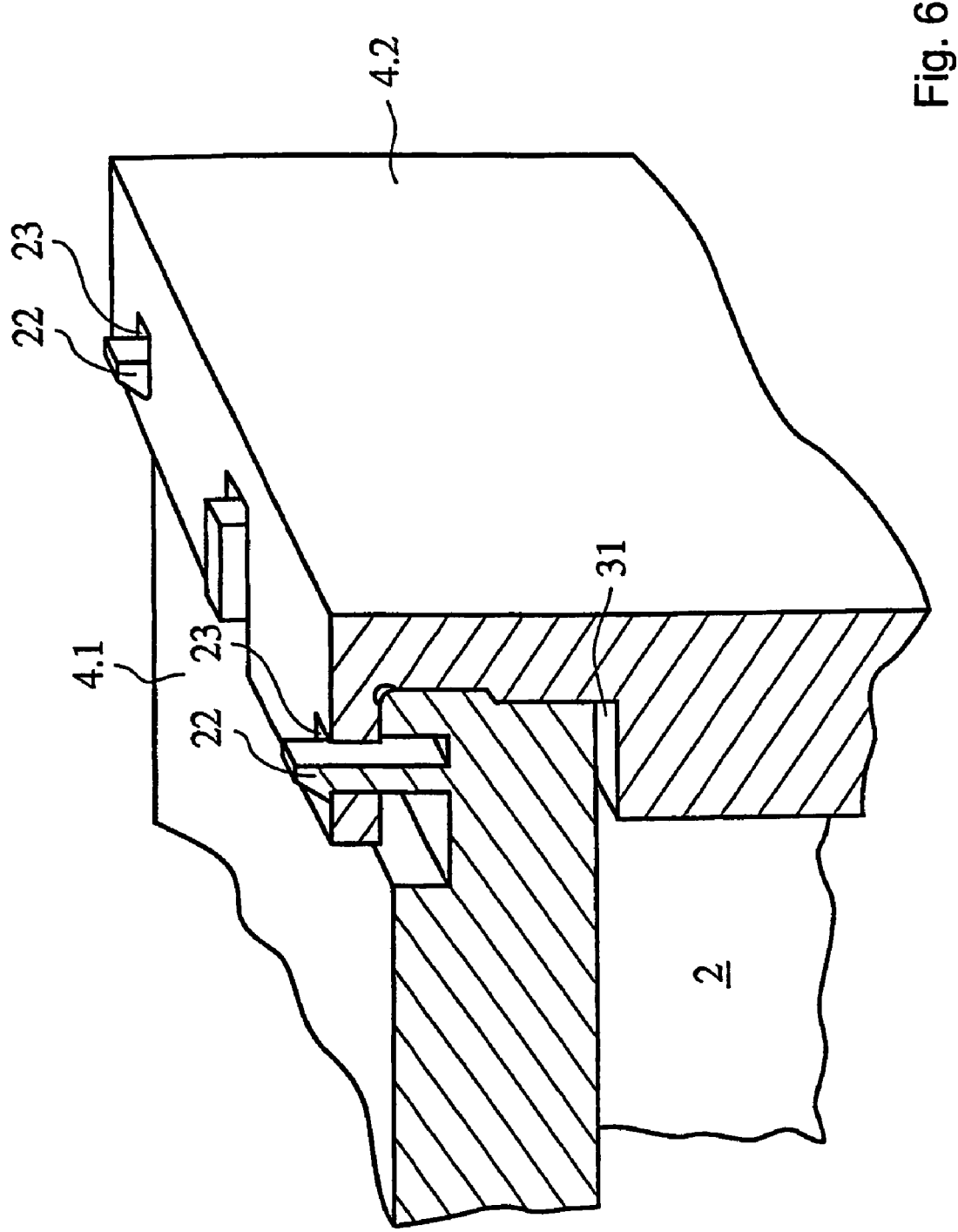
FIG. 6 shows an angled connection between frame segments.

FIG. 6 illustrates an example of an angled connection between the frame segments 4.1 and 4.2 in the final position which is suitable, for example, to carry out the installation method described in relation to FIG. 3. In the installation position, the lateral frame segment 4.2 is placed at an angle shown as exceeding 90° with the latching openings 23 onto the latching lugs 22, which are integrally formed on the frame segment 4.1, and is subsequently pivoted into the position illustrated, to enclose the filling panel 2. The latching lugs 22 are intended to secure the final position of the frame segments 4 in conjunction with an undercut 31 in the frame segment 4.2, into which the frame segment 4.1 pivots.

Figure 7:
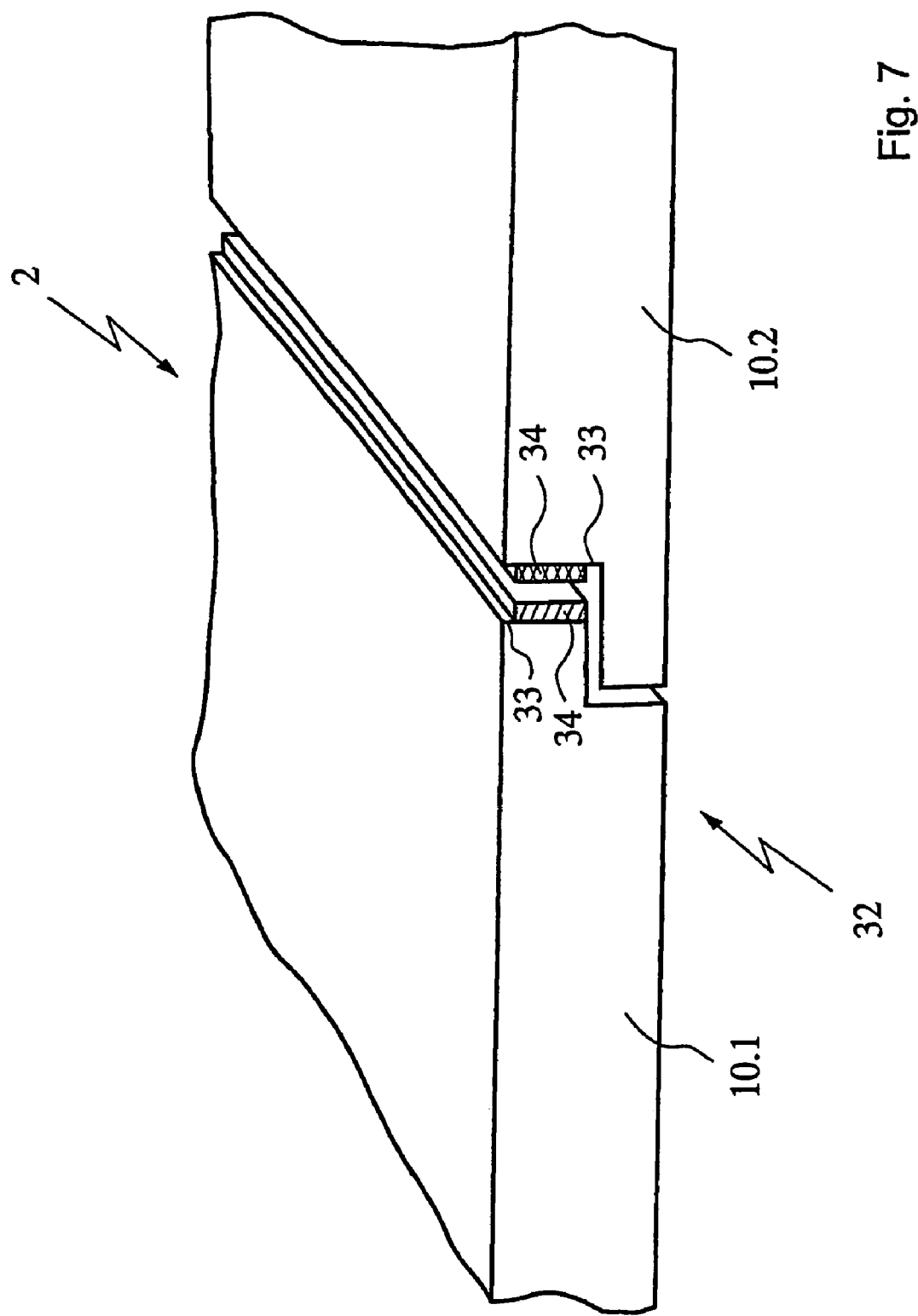
FIG. 7 shows a butt connection between the segments of a multi-piece filling panel.

FIG. 7 shows the possible formation of a filling panel 2 between the segments 10.1 and 10.2. The filling panel is provided in the abutting region with a Z-shaped transition 32. The abutting surfaces 33, which face the vehicle body and run orthogonally with the filling panel 2, can be connected to each other via adhesive tapes 34. Alternatively, the connection can also be undertaken, for example, by a touch-and-close fastener, or the like.

Figure 8:
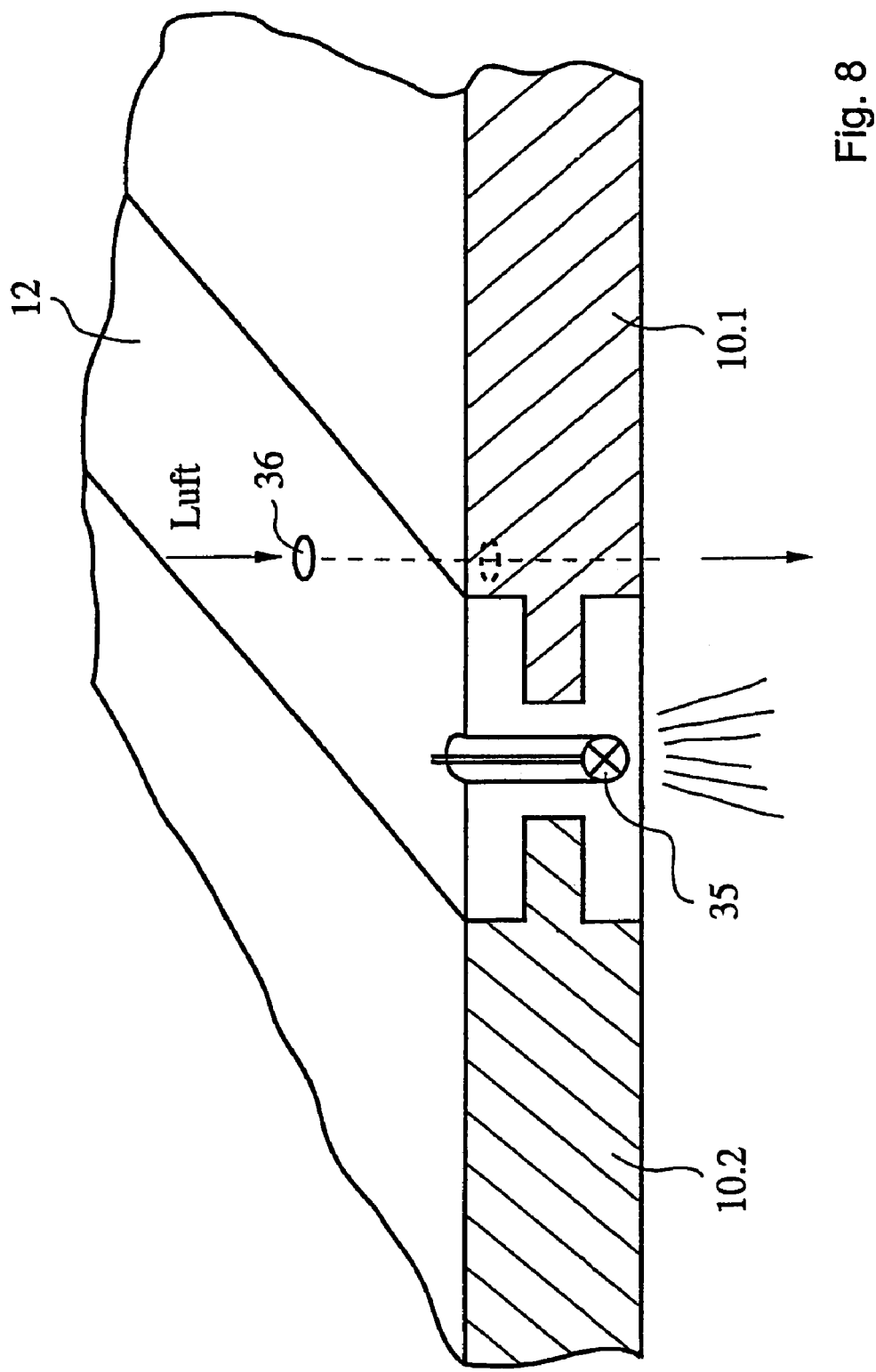
FIG. 8 shows a connection between the segments of a filling panel and a transverse strut of the frame.

In the embodiment shown according to FIG. 8, the segments 10.1 and 10.2 are shown embedded in a form-fitting manner in a transverse strut 12 of the frame 2, the strut having additional functionalities in the form of a lamp 35 or a ventilation opening 36.

Figure 9:
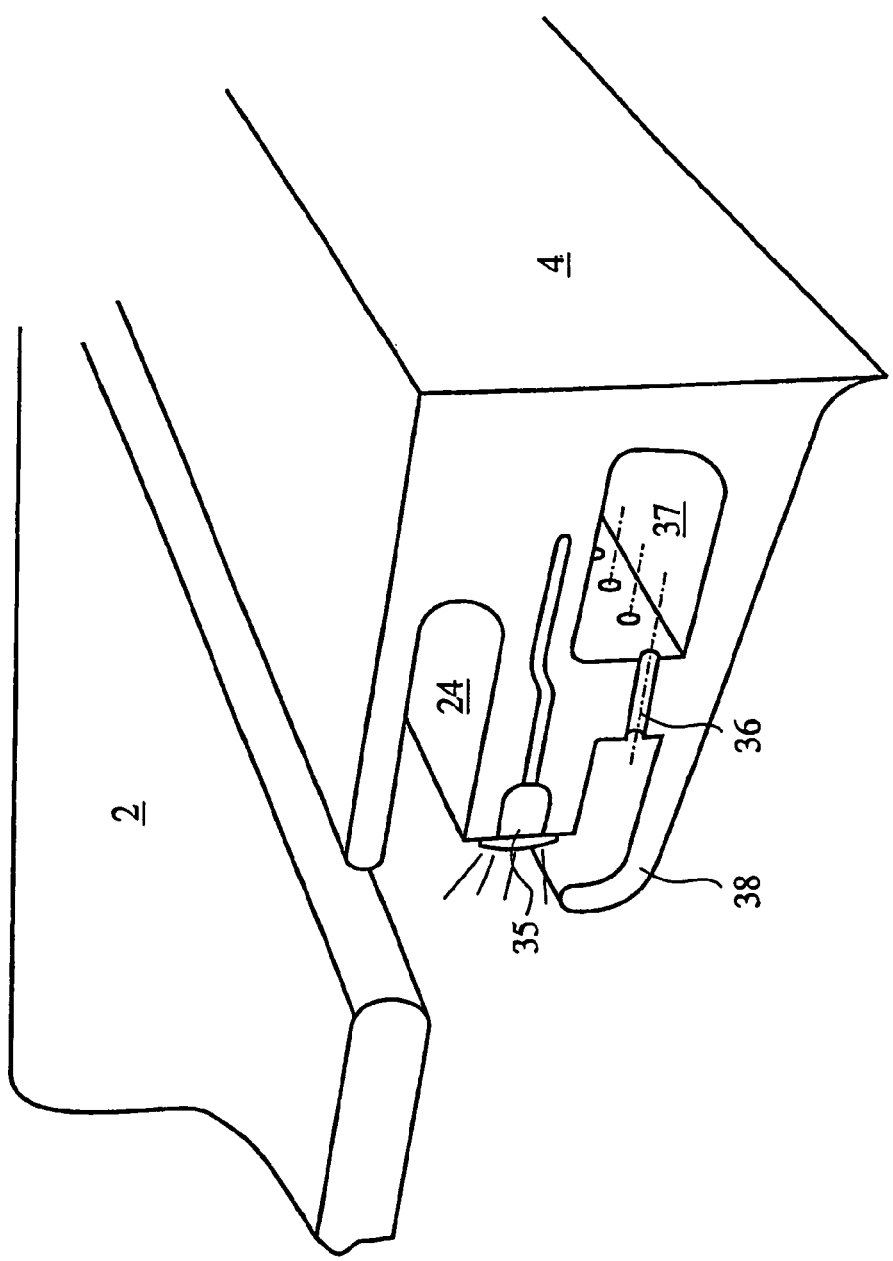
FIG. 9 shows a first connection between the filling panel and a frame segment.

FIG. 9 illustrates an embodiment of a connection between the filling panel 2 and a frame segment 4, in which the filling panel 2 can be pushed into a groove 24 of the frame segment 4. Below the groove 24, lamps 35 are shown embedded in the frame segment 4 which is also shown to include a ventilation duct 37 that communicates with the vehicle interior via ventilation openings 36. A projection 38 which is integrally formed on the frame segment 4 and protrudes into the interior of the vehicle covers the ventilation openings 36 in such a manner that they are no longer visible for the occupants.

Figure 10:
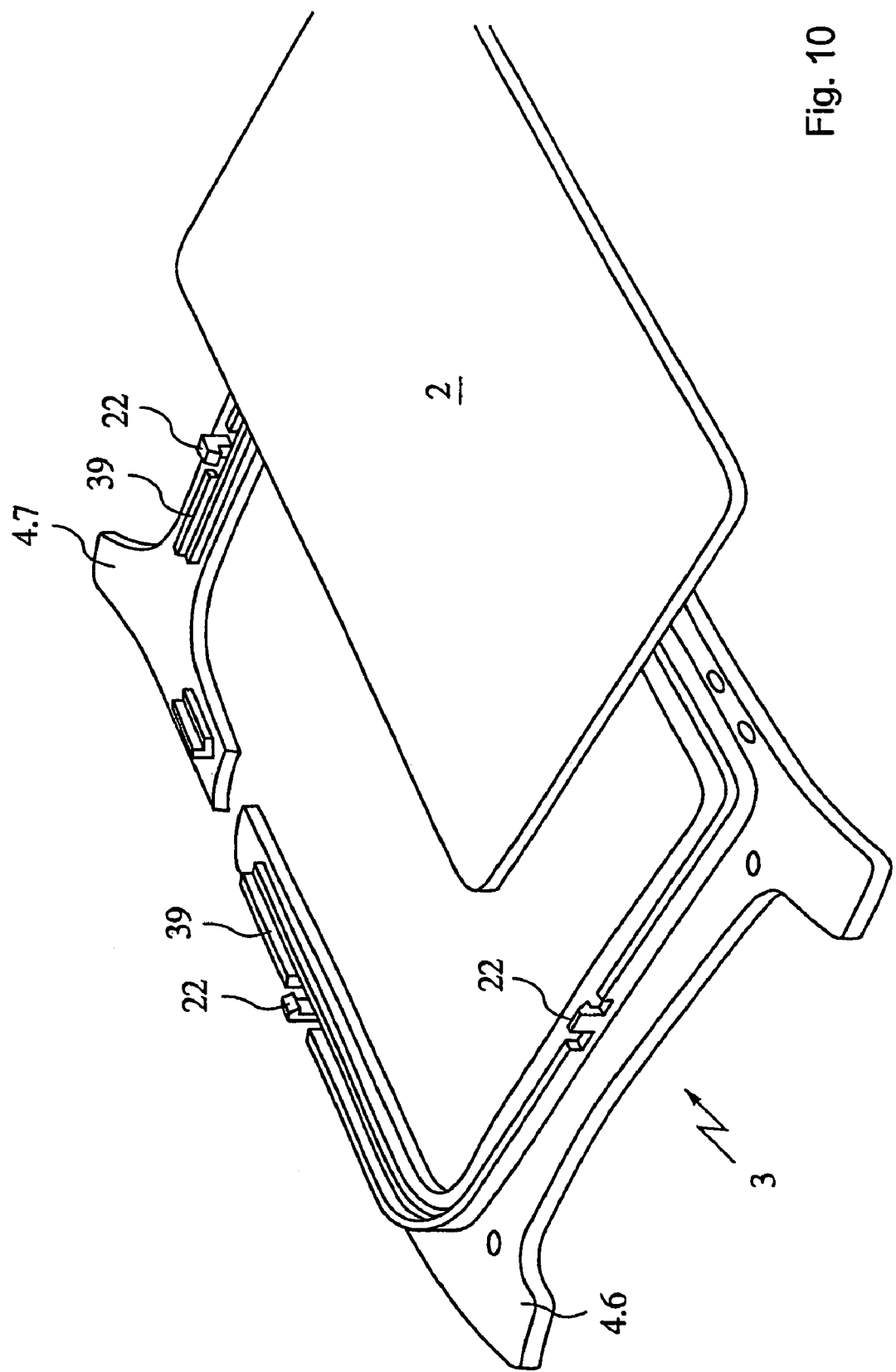
FIG. 10 shows a further connection of the filling panel to the frame.

FIG. 10 shows another embodiment of the connection between the filling panel 2 and frame segment 4. The frame 2 is shown to comprise two U-shaped frame segments 4.6 and 4.7 which are fitted to each other by their limbs to form a rectangular frame 2. The frame segments 4.6, 4.7 are provided with an upwardly protruding, essentially encircling web 39. The latter has a plurality of latching lugs 22 into which the filling panel 2 may be latched from above.

FIG. 11 illustrates connecting elements for installing the paneling element 1 in the vehicle body. In the illustrated embodiment, the filling panel 2 completely covers the frame 3, which is shown with an S-shaped cross section. The fastening between the paneling element 1 and the support 40 of the vehicle body takes place via dowels 41 which are first placed into the filling panel 2 or are integrally formed thereon and are then pushed into holes 42 of the support 40. Insertion of a screw 43 causes the dowel 41 to be expanded on the end side and to be anchored in the vehicle body. Undoing the screw 43 enables the paneling element 1 to be detached again from the vehicle.

The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating configuration and arrangement of the preferred and other exemplary embodiments without departing from the spirit of the present inventions as expressed in the appended claims.

The invention claimed is:

1. A paneling element for the roof of a vehicle interior, comprising a filling panel and support element connected to the filling panel;
   the support element forming a frame which surrounds the filling panel at least in a U shape and includes at least two interconnected frame segments;
   the at least two frame segments having a projection extending along one side; the projection arranged to substantially surround a perimeter of the filling panel and to position the filling panel on the frame; and
   a plurality of latching lugs coupled to the projection and operable to retain the filling panel on the frame.

2. The paneling element of claim 1 wherein the frame surrounds the entire circumference of the filling panel.

3. The paneling element of claim 1 wherein the frame segments further comprise a connecting region having one or more coupling devices configured for transmission of at least one of electric current, a light or light signals, mechanical movements, liquid fluids, and gaseous fluids.

4. The paneling element of claim 1 further comprising operating elements disposed in at least one of the frame segments, wherein the operating elements can be actuated from the vehicle interior.

5. The paneling element of claim 4 wherein the operating elements are separated from the vehicle interior by a flexible film.

6. The paneling element of claim 4 further comprising functional elements that can be activated by the operating elements and disposed in the frame segments on a side facing the vehicle body.

7. The paneling element of claim 1 further comprising at least one accessory part disposed in at least one of the frame segments, and selected from the group consisting of a sun visor, a rear view mirror, a side airbag and a lamp.

8. The paneling element of claim 1 wherein the frame includes a region in which the frame segments are connected with a separating layer of a material differing from the material of the frame segments.

9. The paneling element of claim 8 wherein the separating layer is designed as a separate shaped part configured to fit between the frame segments.

10. The paneling element of claim 9 wherein the shaped part further comprises latching lugs configured to be anchored in the frame segments.

11. The paneling element of claim 1 wherein the frame segments can be connected to each other with a cohesive material joint.

12. The paneling element of claim 1 wherein the frame segments can be interconnected in a form-fitting manner.

13. The paneling element of claim 1 wherein at least one frame segment is a removable frame segment that can be removed after the paneling element has been fitted into the vehicle body.

14. The paneling element of claim 13 wherein the removable frame segment is configured for introducing and/or positioning the paneling element in the vehicle interior during installation of the paneling element, and is then removed after the paneling element has been fitted into the vehicle body.

15. The paneling element of claim 1 wherein the filling panel is provided in a number of segments having co-acting connecting regions.

16. The paneling element of claim 15 wherein the segments of the filling panel are provided in their connecting regions with coupling devices configured for the transmission of at least one of electric current, light or light signals, or flow of liquid or gaseous fluids.

17. The paneling element of claim 15 wherein the segments of the filling panel are surrounded by the frame.

18. The paneling element of claim 1 wherein an interior side of the frame comprises a transverse or longitudinal support element which spans the filling panel.

19. The paneling element of claim 1 wherein the frame segments further comprise devices for absorbing kinetic energy.

20. The paneling element of claim 19 wherein the device for absorbing kinetic energy comprises at least one of ribbings, honeycomb structures, inserts of foam materials, and foamed aluminum.

21. An overhead panel system for an interior of a vehicle, comprising:
   a relatively soft panel member configured for placement along a roof region of the vehicle;
   at least two relatively rigid frame segments at least partially surrounding the panel member;
   at least one connector disposed on the frame segments and configured to interconnect the frame segments into a substantially rectangular support member; and
   at least one groove extending along a length of the frame segments to receive and secure the panel member to the support member.

22. The system of claim 21 wherein the connector comprises at least one of a weld, a bond and a latch.

23. The system of claim 21 wherein the frame segments include receiving points formed therein for mounting an accessory.

24. The system of claim 23 wherein the frame segments further comprise at least one accessory mounted therein.

25. The system of claim 24 wherein the accessory comprises a sun visor.

26. The system of claim 24 wherein the accessory comprises a rear view mirror.

27. The system of claim 24 wherein the accessory comprises an airbag device.

28. The system of claim 24 wherein the accessory comprises an illuminating device.

29. The system of claim 24 wherein the accessory comprises a grab handle.

30. The system of claim 24 wherein the accessory comprises a console.

31. The system of claim 24 wherein the accessory comprises a ventilation system component.

32. The system of claim 24 wherein the frame segments comprise an energy absorbing device.

33. The system of claim 32 wherein the energy absorbing device comprises at least one of a ribbing, a honeycomb structure, and a foam insert.

34. The system of claim 21 wherein the panel member comprises a material with acoustic properties.

35. The system of claim 21 wherein the panel member comprises a first panel member segment and a second panel member segment.

36. The system of claim 21 wherein the panel member further comprises a glass panel member.

37. The system of claim 21 wherein the frame segments further comprise coupling elements configured to transmit at least one of an electric current, a light, a light signal, and a flow of, liquid fluid or a gaseous fluid.

38. The system of claim 21 wherein a separating layer is interposed between adjacent frame segments.

39. A panel system for use within an interior of a vehicle, comprising:
a panel member configured for placement proximate the overhead portion of the interior of the vehicle;
a support member substantially surrounding the panel member and configured for attachment to the vehicle, the support member comprising a plurality of frame segments interconnected by connectors and at least one fastener for securing the panel member to the support member;
the frame segments including a ventilation duct that communicates with the interior of the vehicle through ventilation openings; and
an accessory mounted to a receiving structure on a frame segment and configured for use by an occupant of the vehicle.

40. The system of claim 39 wherein the accessory is selected from the group consisting of a sun visor, a rearview mirror, an airbag device, an illuminating device, a grab handle, a console, and an energy absorbing device.

41. The system of claim 39 wherein the plurality of frame segments is four frame segments.

42. The system of claim 39 wherein at least one of the frame segments further comprises a coupling element configured to transmit at least one of an electric current, a light, a light signal, and a flow of, liquid fluid or a gaseous fluid.

43. The system of claim 39 wherein the frame segments comprise an energy absorbing device.

44. The system of claim 43 wherein the energy absorbing device comprises at least one of a ribbing, a honeycomb structure, and a foam insert.

45. The system of claim 39 wherein the connector comprises at least one of a weld, a bond, and a latch.

46. The system of claim 39 further comprising at least one transverse strut.

47. The system of claim 39 further comprising anchors for attaching the support member to a body structure of the vehicle.

* * * * *